US008061442B2

(12) United States Patent
Alberty

(10) Patent No.: US 8,061,442 B2
(45) Date of Patent: Nov. 22, 2011

(54) METHOD TO DETECT FORMATION PORE PRESSURE FROM RESISTIVITY MEASUREMENTS AHEAD OF THE BIT DURING DRILLING OF A WELL

(75) Inventor: Mark William Alberty, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 38 days.

(21) Appl. No.: 12/168,628

(22) Filed: Jul. 7, 2008

(65) Prior Publication Data

US 2010/0000791 A1    Jan. 7, 2010

(51) Int. Cl.
*E21B 25/16* (2006.01)
(52) U.S. Cl. ............... 175/45; 175/40; 175/50; 175/58; 175/493; 166/250.01; 166/264; 73/152.01; 324/300; 324/376
(58) Field of Classification Search .............. 175/40, 175/50, 20, 58, 493; 73/152.01; 324/300, 324/376
See application file for complete search history.

(56) References Cited

U.S. PATENT DOCUMENTS

| | | | |
|---|---|---|---|
| 2,214,674 | A | 1/1938 | Hayward |
| 3,785,446 | A | 1/1974 | Fertl et al. |
| 4,442,011 | A | 4/1984 | Thaler et al. |
| 4,447,338 | A | 5/1984 | Lundberg et al. |
| 5,508,616 | A | 4/1996 | Sato et al. |
| RE35,386 | E | 12/1996 | Wu et al. |
| 5,720,355 | A | 2/1998 | Lamine et al. |
| 5,881,310 | A | 3/1999 | Airhart et al. |
| 5,906,966 | A | 5/1999 | Thaler et al. |
| 5,963,037 | A | 10/1999 | Brady et al. |
| 6,006,844 | A | 12/1999 | Van Puymbroeck et al. |
| 6,272,434 | B1 | 8/2001 | Wisler et al. |
| 6,480,118 | B1 | 11/2002 | Rao |
| 6,556,014 | B1 | 4/2003 | Kong et al. |
| 6,580,068 | B1 | 6/2003 | Tarver, III et al. |
| 6,856,909 | B2 | 2/2005 | Banning-Geertsma |
| 7,023,213 | B2 | 4/2006 | Nichols |
| 7,066,282 | B2 * | 6/2006 | Chen et al. ............... 175/50 |

(Continued)

FOREIGN PATENT DOCUMENTS

GB    2256715 A    12/1992

(Continued)

OTHER PUBLICATIONS

Eaton, B. A, "The Effect of Overburden Stress on Geopressure Prediction from Well Logs", J. Petrol. Tech., Aug. 1972, pp. 929-934, SPE-AIME.

(Continued)

*Primary Examiner* — Jennifer H Gay
*Assistant Examiner* — Yong-Suk Ro
(74) *Attorney, Agent, or Firm* — Barbara Ann Fisher

(57) ABSTRACT

Methods of using resistivity ahead of a drill bit measurements obtained while drilling a subterranean well using a drilling mud. Resistivity data ahead of the bit is gathered during drilling and prior to penetrating a region of interest of a known subterranean formation using the drill bit and the drilling mud. The drill string progresses at known dip and azimuth angles toward the subterranean formation. The resistivity data is used to determine pore pressure ahead of the drill bit in the formation as a function of resistivity ahead of the drill bit in the formation while the drill bit advances toward but before the bit penetrates the formation while drilling.

24 Claims, 10 Drawing Sheets

U.S. PATENT DOCUMENTS

| | | | |
|---|---|---|---|
| 7,202,669 | B2 | 4/2007 | Ellingsrud et al. |
| 7,203,599 | B1 | 4/2007 | Strack et al. |
| 7,307,424 | B2 | 12/2007 | MacGregor et al. |
| 7,310,580 | B2 | 12/2007 | Zhou et al. |
| 2002/0149498 | A1 | 10/2002 | Tabanou et al. |
| 2004/0236513 | A1 | 11/2004 | Tutuncu et al. |
| 2005/0067190 | A1* | 3/2005 | Tabanou et al. ............. 175/50 |
| 2005/0092487 | A1 | 5/2005 | Banning et al. |
| 2005/0093546 | A1 | 5/2005 | Banning et al. |
| 2005/0257960 | A1 | 11/2005 | McGregor et al. |
| 2006/0038571 | A1 | 2/2006 | Ostermeier et al. |
| 2006/0055411 | A1 | 3/2006 | Banning et al. |
| 2006/0061363 | A1 | 3/2006 | Banning et al. |
| 2006/0061364 | A1 | 3/2006 | Banning et al. |
| 2007/0108981 | A1 | 5/2007 | Banning-Geertsma et al. |
| 2007/0127314 | A1 | 6/2007 | Wang et al. |
| 2007/0216416 | A1 | 9/2007 | Itskovich |
| 2007/0256832 | A1 | 11/2007 | Hagiwara et al. |
| 2007/0285274 | A1* | 12/2007 | Esmersoy ............. 340/853.5 |
| 2009/0260878 | A1 | 10/2009 | Morley et al. |
| 2010/0000729 | A1 | 1/2010 | Alberty |
| 2010/0000792 | A1 | 1/2010 | Alberty |

FOREIGN PATENT DOCUMENTS

| | | |
|---|---|---|
| WO | 93/07514 | 4/1993 |
| WO | 97/05361 | 2/1997 |
| WO | 99/00575 | 1/1999 |
| WO | 00/00849 | 1/2000 |
| WO | 00/00850 | 1/2000 |
| WO | 2004/113674 A1 | 12/2004 |
| WO | 2007/022116 A1 | 2/2007 |

OTHER PUBLICATIONS

Banning, et al., "Imaging of a subsurface conductivity distribution using a time-domain electromagnetic . . .",SEG/San Antonio 2007 Ann. Mtg, pp. 648-652, SEG, USA.

Hottmann, et al., "Estimation of Formation Pressures from Log-Derived Shale Properties", J. of Petrol. Tech., Jun. 1965, pp. 717-722, USA.

Omeragic, et al., "Deep Directional Electromagnetic Measurements for Optimal Well Placement", SPE 97045, 2005, pp. 1-12, Society of Petrol. Engrs., USA.

Lindom, et al., "Electromagnetic Prospect Scanning—Seabed Logging Moves From Risk Reduction to Value Creation", SPE 108631, 2007, pp. 1-6, Society of Petrol. Engrs., USA.

Abubakar, et al., "A Two-and-Half-Dimensional Model-Based Inversion Algorithm for the Controlled-Source Electromagnetic Data", SPE 110054, 2007, Society of Petrol. Engrs., USA.

Chandola, et al.,"Challenges in Shallow Water CSEM Surveying: A Case History from Southeast Asia", IPTC 11511, 2007, pp. 1-5, Int. Petrol. Tech. Conf., Dubai, UAE.

Gianzero, et al., "A New Resistivity Tool for Measurement-While-Drilling", SPWLA Twenty-Sixth Ann. Logging Symposium, Jun. 17-20, 1985, pp. 1-22, SPWLA, USA.

PCT International Search Report and the Written Opinion dated Dec. 18, 2009 for International Application No. PCT/US2009/049702.

PCT Partial Search Report (Annex to Invitation to Pay Additional Fees) dated Dec. 2, 2009 for International Application No. PCT/US2009/049706.

PCT International Search Report dated Dec. 17, 2009 for International Application No. PCT/US2009/049709.

PCT Partial Search Report (Annex to Invitation to Pay Additional Fees) dated Nov. 12, 2009 for International Application No. PCT/US2009/049709.

PCT International Search Report and the Written Opinion dated Feb. 12, 2010 for International Application No. PCT/US2009/049706.

PCT International Preliminary Report on Patentability and Written Opinion of the International Searching Authority, issued in related patent application No. PCT/US2009/049709, mailed Jan. 11, 2011, 8 pages.

Hubbert et al., "Role of Fluid Pressure in Mechanics of Overthrust Faulting", Bulletin of the Geological Society of America, Jan.-Jun. 1959, pp. 115-166, vol. 70, Published by the Society, New York, US.

PCT International Preliminary Report on Patentability and Written Opinion of the International Searching Authority, issued in related patent application No. PCT/US2009/049702, mailed Jan. 11, 2011, 5 pages.

* cited by examiner

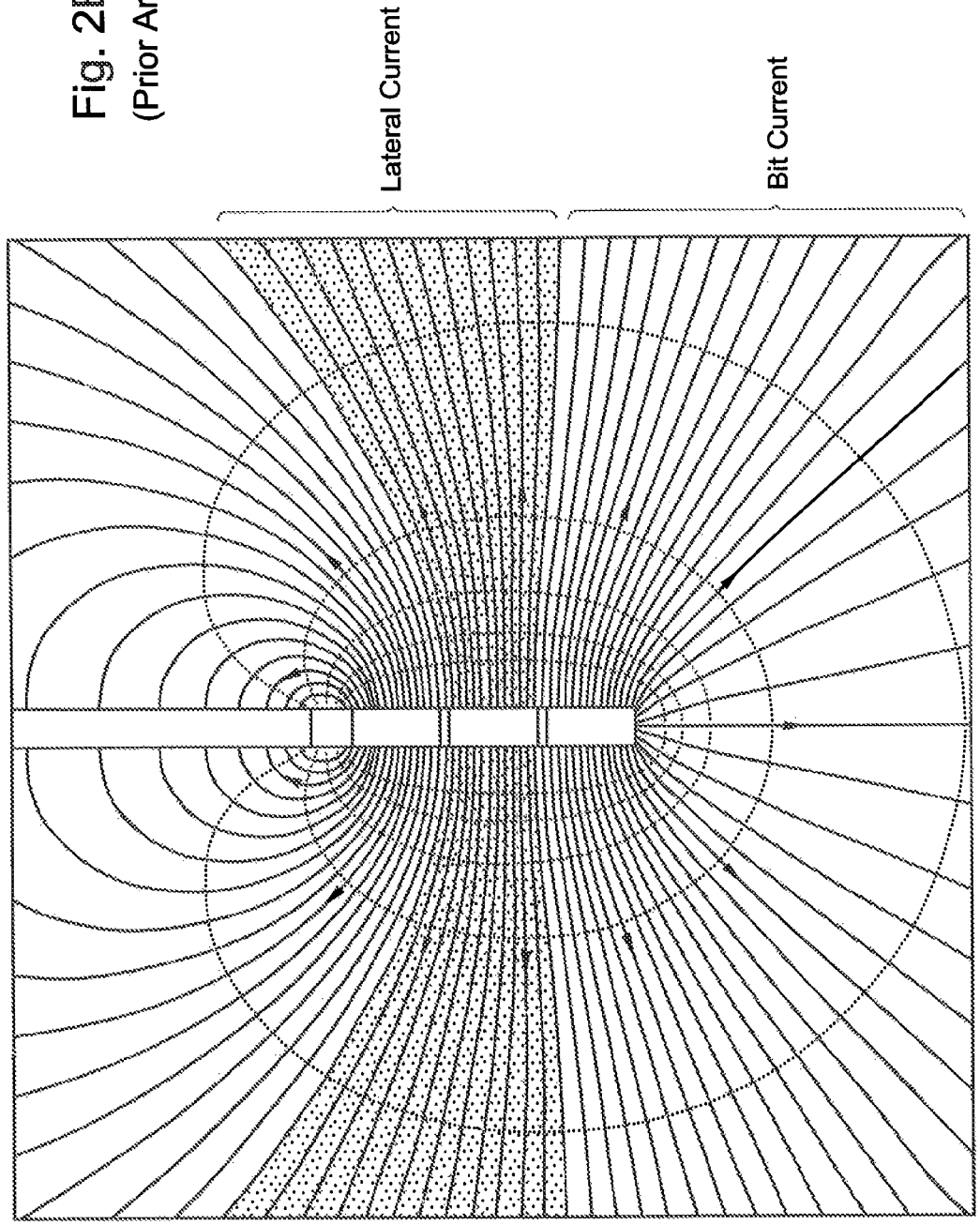

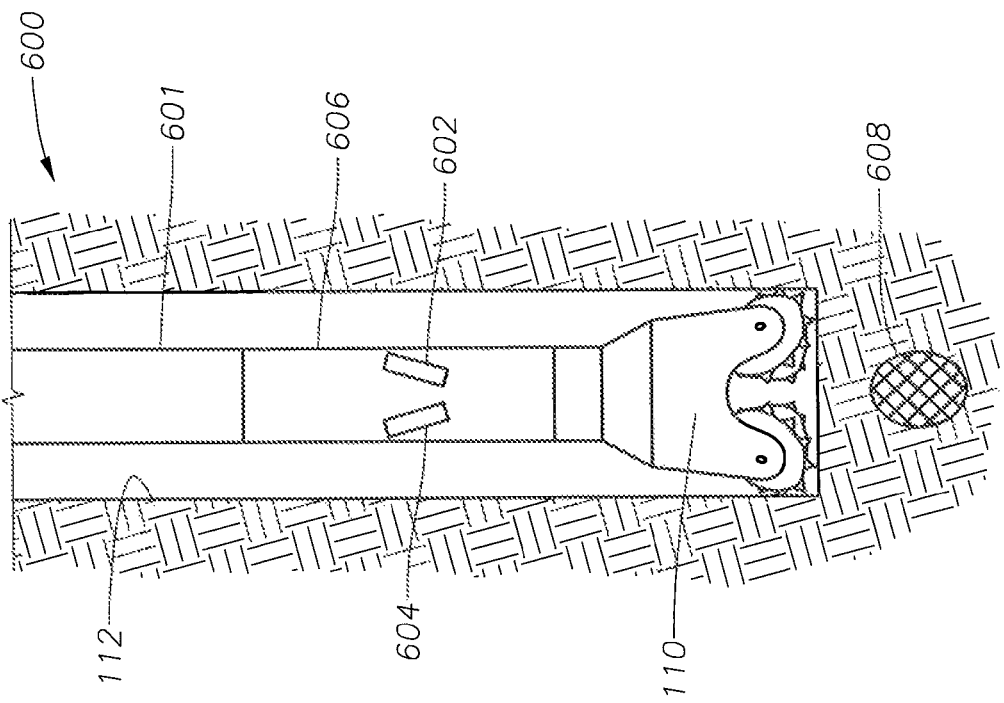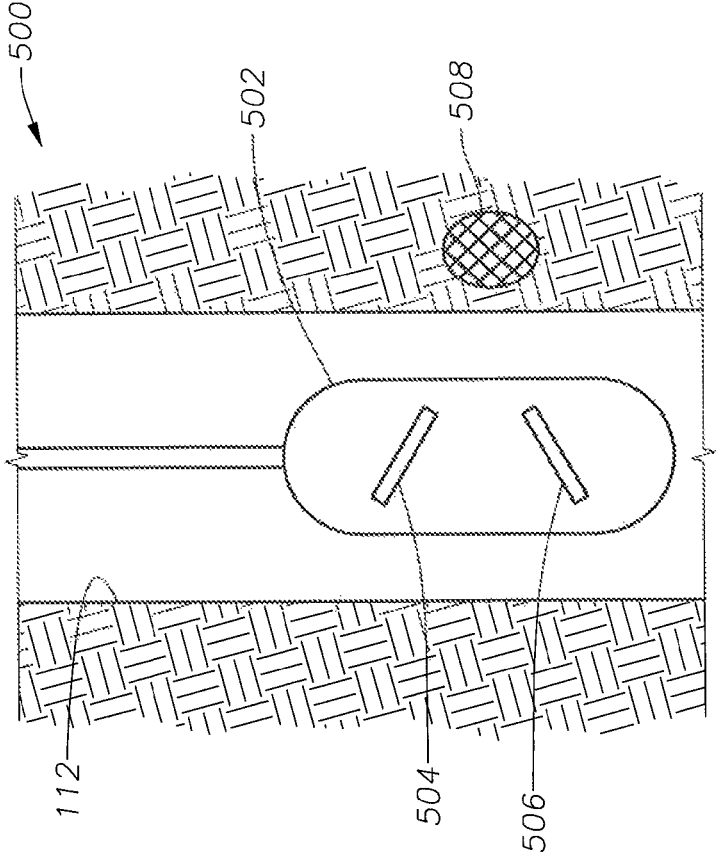

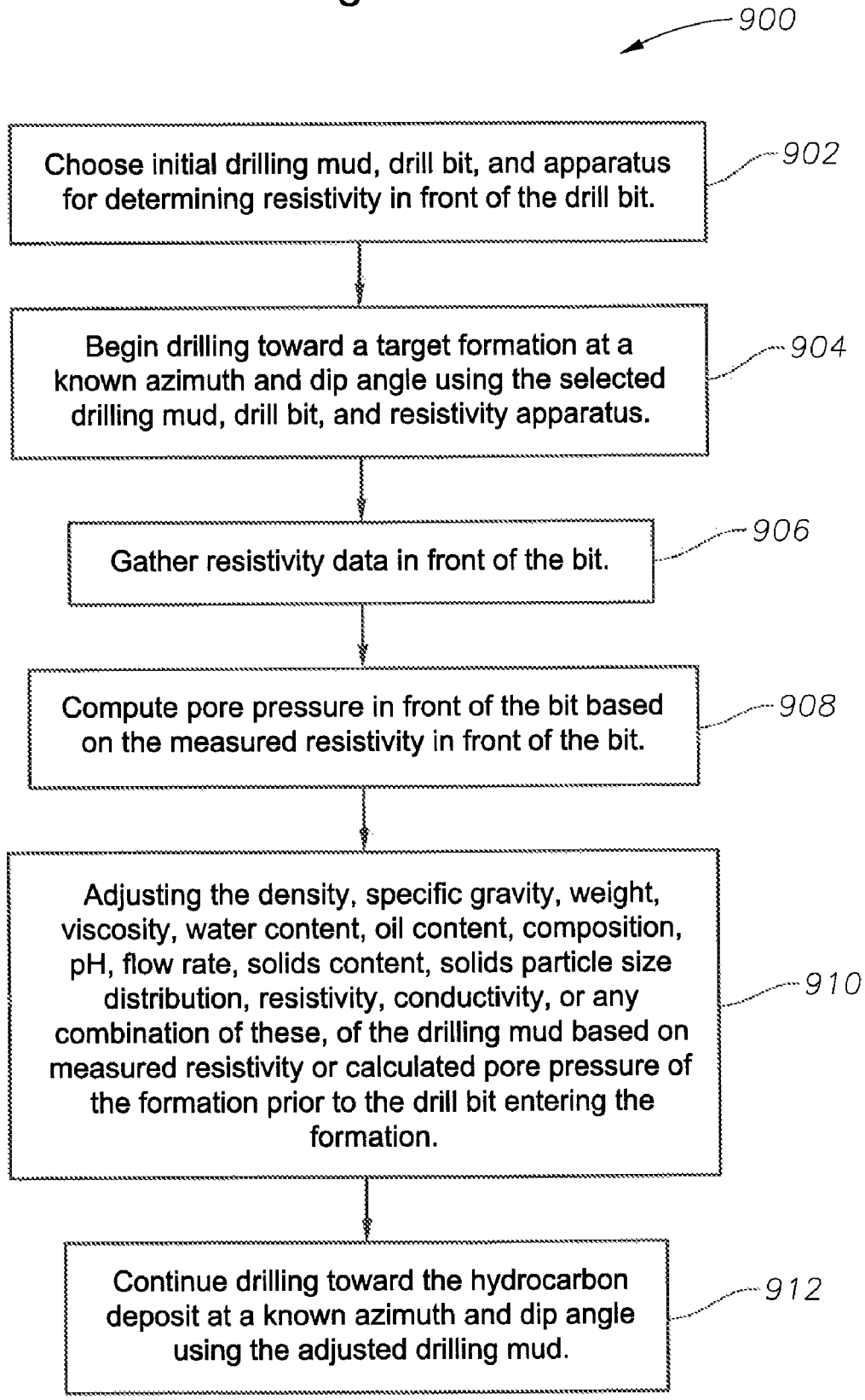

METHOD TO DETECT FORMATION PORE PRESSURE FROM RESISTIVITY MEASUREMENTS AHEAD OF THE BIT DURING DRILLING OF A WELL

CROSS-REFERENCE TO RELATED APPLICATIONS

The present application is related to U.S. application Ser. No. 12/168,659 and 12/168,703, filed on even date herewith, and which are incorporated herein by reference in their entirety.

BACKGROUND INFORMATION

1. Technical Field

The present disclosure relates in general to methods of drilling wellbores, for example, but not limited to, wellbores for producing hydrocarbons from subterranean formations, and more particularly to methods of using resistivity data ahead of the drill bit to determine pore pressure in the formation as a function of resistivity while the drill bit advances toward but before the bit penetrates a desired region in the formation while drilling.

2. Background Art

Hubbert et al., "Role of Fluid Pressure in Mechanics of Overthrust Faulting, Part I", Bull., GSA (February 1959) 70, published a comprehensive treatment of the theory of compaction of clay soils by overburden pressure. They showed that as the overburden stress is increased as a result of burial depth, the porosity of a given sedimentary rock is decreased. Therefore, some fluid that was once in the pores of a given formation was later squeezed out by compaction. In many such cases, there is no escape route for the fluid, and thus the fluid becomes overpressured. This happens in many areas, and such generated overpressured zones are often called "abnormal" pressure zones or "geopressure" zones. Geopressure is often referred to as pore pressure.

Formation resistivity measurements are commonly made in oil and gas wells and then used to make decisions about the presence of hydrocarbons, the magnitude of pore pressure, the correlation to formations observed in offset wells, the salinity of formation fluids, porosity of formations, and the presence of permeability. FIG. 1 illustrates graphically the prior art concept of measuring resistivity as a function of depth, showing a typical decrease in resistivity at a depth where increased geopressure (pore pressure) exists (from Eaton, "The Effect of Overburden Stress on Geopressure Prediction From Well Logs", SPE 3719 (1972)). In shale rocks, resistivity data points diverge from the normal trend toward lower resistivity values, owing to high porosity, overpressured formations.

Existing techniques to measure resistivity are made after the bit penetrates the formation using either electric line logging methods or logging while drilling methods. In either case the formation of interest has already been exposed to the well in order to make the resistivity measurement. This exposure presents problems, including the fact that the condition of the borehole itself and surrounding disturbed formation will have an effect on the very resistivity values being sought, as noted by Hottman et al., "Estimation of Formation Pressures From Log-Derived Shale Properties", SPE 1110 (1965).

Banning et al. discuss a theoretical application of time-domain electromagnetics (TEM) in a borehole-conveyed logging tool. Banning et al., "Imaging of a subsurface conductivity distribution using a time-domain electromagnetic borehole conveyed logging tool", Society of Exploration Geophysicists, San Antonio Annual Meeting (2007). See also Published U.S. Patent applications numbers 2005/0092487; 2005/0093546; 2006/003857; 2006/0055411; 2006/0061363; 2006/0061364, and U.S. Pat. No. 6,856,909. Banning et al. state that, theoretically, such a tool may be used to image the conductivity distribution around and ahead of the drill bit at comparatively large distances from the borehole. However, Banning et al. do not disclose or suggest use of resistivity measurements in front of a drilling bit to detect the magnitude of formation pore pressure before the formation is exposed to the well, allowing mud parameters to be adjusted to minimize the risk of a well kick (uncontrolled flow into the well) and/or to reduce the risk of the formation collapsing into the well and sticking the drillpipe (from an overbalanced mud weight condition) and potential loss of the well.

To avoid or reduce undesirable consequences, it would be advantageous if resistivity measurements could be used to make drilling decisions on pore pressure and other formation properties in front of the bit before the bit exposes the formation. In addition, there may be safety and economic advantages gained if a resistivity measurement could be made before the formation was actually exposed to the well. The methods of the present disclosure are directed to these needs.

SUMMARY

In accordance with the present disclosure, it has now been determined that if changes in the formation pore pressure can be detected from changes in the resistivity before the formation is exposed to the well, then mud parameters may be adjusted to minimize the risk of a well kick (uncontrolled flow into the well) and to reduce the risk of the formation collapsing into the well and sticking the drillpipe (from an overbalanced mud weight condition) and potential loss of the well.

A first aspect of the disclosure is a method of using resistivity ahead of a drill bit measurements obtained while drilling a subterranean well using a drilling mud, the method comprising:

a) gathering resistivity data ahead of the bit during drilling and prior to penetrating a known subterranean formation using the drill bit and the drilling mud, the drill string progressing at known dip and azimuth angles toward the subterranean formation; and b) using the resistivity data to determine pore pressure (or change in pore pressure) ahead of the drill bit in the formation as a function of resistivity (or change of resistivity) ahead of the drill bit in the formation while the drill bit advances toward but before the bit penetrates the formation while drilling.

In certain embodiments, the method further comprises redirecting the drill bit while drilling toward locations in the formation where pore pressure is within an acceptable range for the mud and pressure control equipment being used. Certain other methods further comprise adjusting the density, composition, flow rate, or combinations of any of these, of the drilling mud based on measured resistivity or calculated pore pressure of the formation.

Another aspect of the invention is a method of reducing risk of a subterranean well formation collapse into a subterranean well being drilled toward the formation using resistivity ahead of the bit measurements obtained while drilling the well using a drilling mud, the method comprising:

a) gathering resistivity data ahead of the bit during drilling and prior to penetrating a known subterranean formation using the drill bit and the drilling mud, the drill string progressing at known dip and azimuth angles toward the subterranean formation;

b) using the resistivity data to determine pore pressure (or change in pore pressure) of the formation while the drill bit advances toward but before the bit penetrates the formation while drilling;

c) estimating the likelihood of well wall collapse using the pore pressure; and d) adjusting the density, composition, flow rate, or combination thereof, of the drilling mud based on the pore pressure of the formation.

Methods in accordance with the disclosure may measure resistivity in front of the bit using a method, for example, but not limited to: contact resistivity measurement focused in front to the bit; use of a transient electromagnetic survey; continuous deep directional electromagnetic measurements; and use of guided electromagnetic waves along the drill pipe. As explained further herein, each of these techniques would be modified to determine formation resistivity ahead of the bit during drilling, and prior to the bit penetrating the formation.

The methods described herein may provide other benefits, and the methods for obtaining the resistivity measurements ahead of the drill bit are not limited to the methods noted; other methods may be employed.

These and other features of the methods of the disclosure will become more apparent upon review of the brief description of the drawings, the detailed description, and the claims that follow.

BRIEF DESCRIPTION OF THE DRAWINGS

The manner in which the objectives of this disclosure and other desirable characteristics can be obtained is explained in the following description and attached drawings in which:

FIG. 2B illustrates the computed current pattern obtained from the apparatus of FIG. 2A;

FIG. 5 is a schematic illustration representative of the prior art technique and apparatus of Sato et al., illustrating a method of and an apparatus for directional induction logging of formations around a borehole;

FIG. 6 illustrates schematically a modified apparatus of FIG. 5, modified for the purposes of the present disclosure to have the receivers tuned to isolate the signal arriving from the formation in front of the drill bit;

FIG. 9 illustrates one method of the present disclosure in flowchart form.

Figure 1:
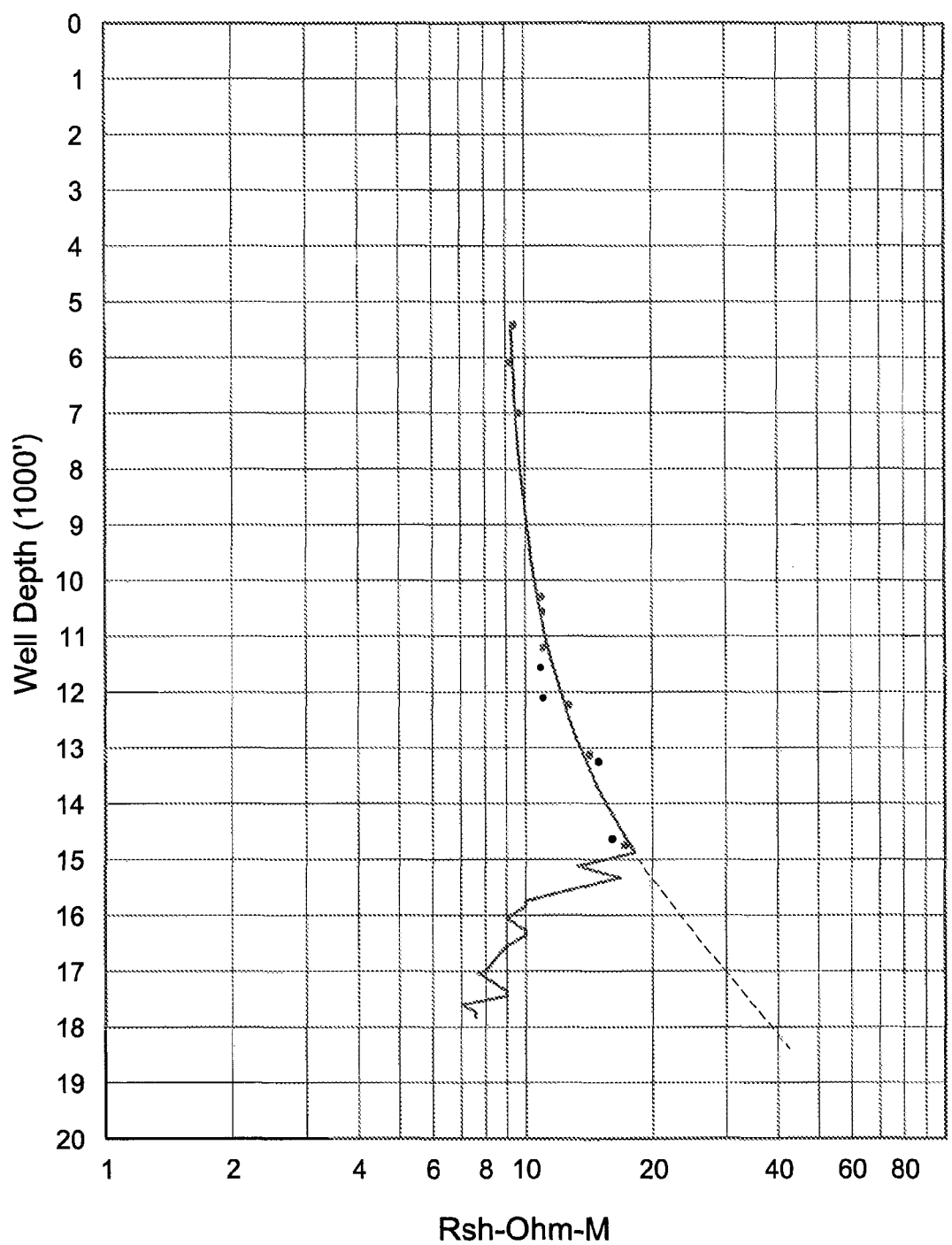
FIG. 1 illustrates graphically the prior art concept of measuring resistivity as a function of depth, showing a typical decrease in resistivity at a depth where increased geopressure (pore pressure) exists.

It is to be noted, however, that the appended drawings are not to scale and illustrate only typical embodiments of this disclosure, and are therefore not to be considered limiting of its scope, for the invention may admit to other equally effective embodiments. Identical reference numerals are used throughout the several views for like or similar elements.

DETAILED DESCRIPTION

In the following description, numerous details are set forth to provide an understanding of the disclosed methods and apparatus. However, it will be understood by those skilled in the art that the methods and apparatus may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

As noted above, it has now been determined that if changes in the formation pore pressure can be detected from changes in the resistivity before the formation is exposed to the well, allowing drilling mud parameters to be adjusted in real time to minimize the risk of a well kick (uncontrolled flow into the well) and to reduce the risk of the formation collapsing into the well and sticking the drillpipe (from an overbalanced mud weight condition) and potential loss of the well. Methods and apparatus of the invention are applicable to both on-shore (land-based) and offshore (subsea-based) drilling.

Figure 2A:
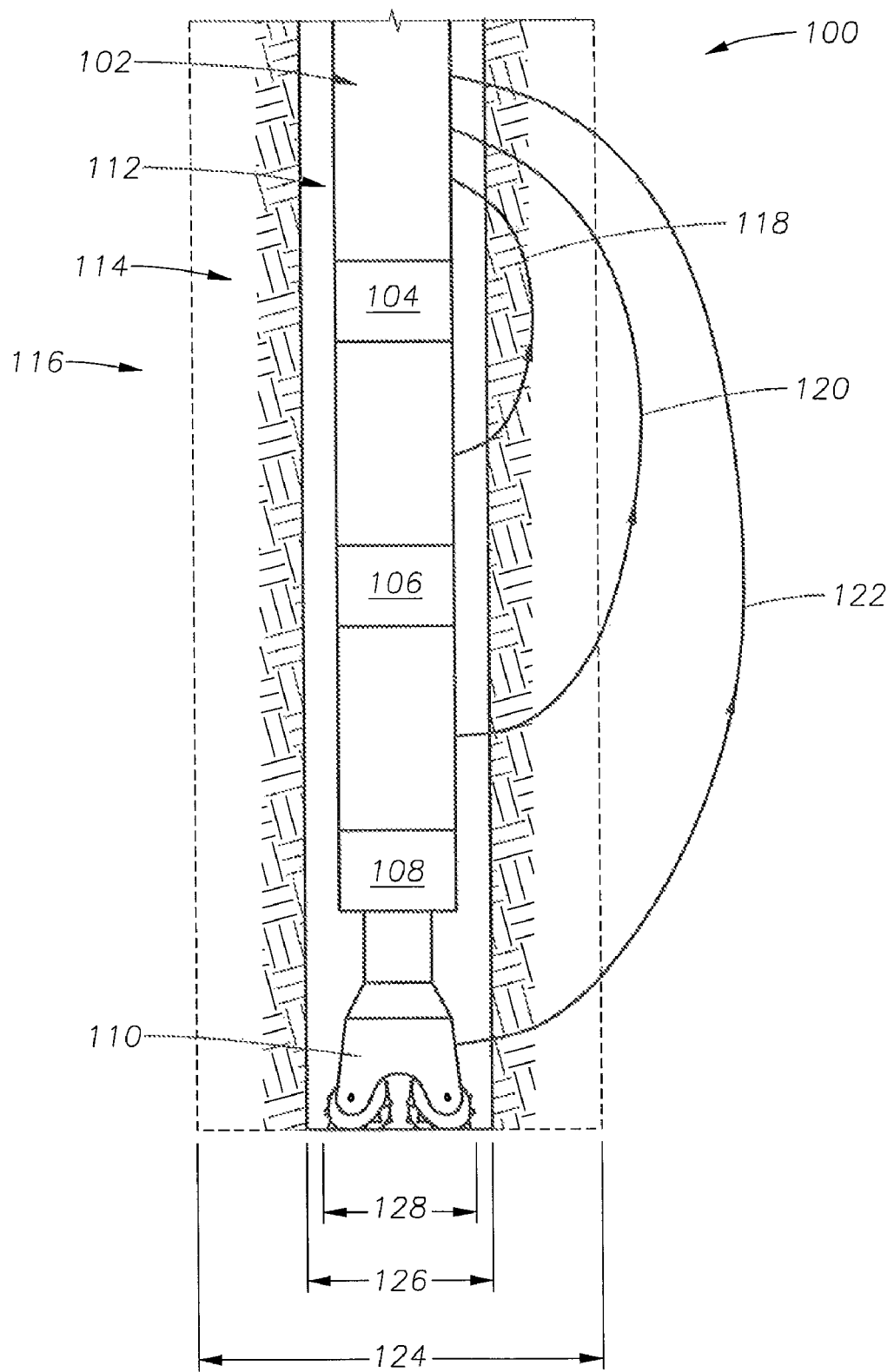
FIG. 2A illustrates schematically a prior art method and apparatus for measuring resistivity.

Any one of a number of methods may be used to log resistivity in front of the drill bit. The following discussion presents some non-limiting examples. In one technique, a contact resistivity measurement focused in front of the bit may be employed. The contact resistivity measurement would be a modified version of that published by Gianzero et al., in their 1985 SPWLA paper (Paper A) "A New Resistivity Tool for Measurement-While-Drilling". In this implementation the drill string is electrically excited, and the current jumping off of the string is measured using toroids. FIG. 2A illustrates the Gianzero et al., apparatus 100, having a drill string collar 102, transmitter toroid 104, upper receiver toroid 106, and lower receiver toroid 108, and a drill bit 110. Illustrated also are the borehole 112, invaded zone 114, and virgin zone 116. A focusing current 118, lateral survey current 120, and bit survey current 122 are illustrated, as are the invasion diameter 124, borehole diameter 126, and bit diameter 128. In this implementation two measurements are made, one between the two toroids 106, 108 placed behind the bit, and the other between the lower toroid 108 and the bit 110, as depicted schematically in FIG. 2B. This lower measurement has a component of "forward looking" (downward in FIG. 2B, but this is not necessarily the direction of drilling) resistivity, but it is fractional due to the placement of the toroid 108 well behind the bit 110.

Figure 3A:
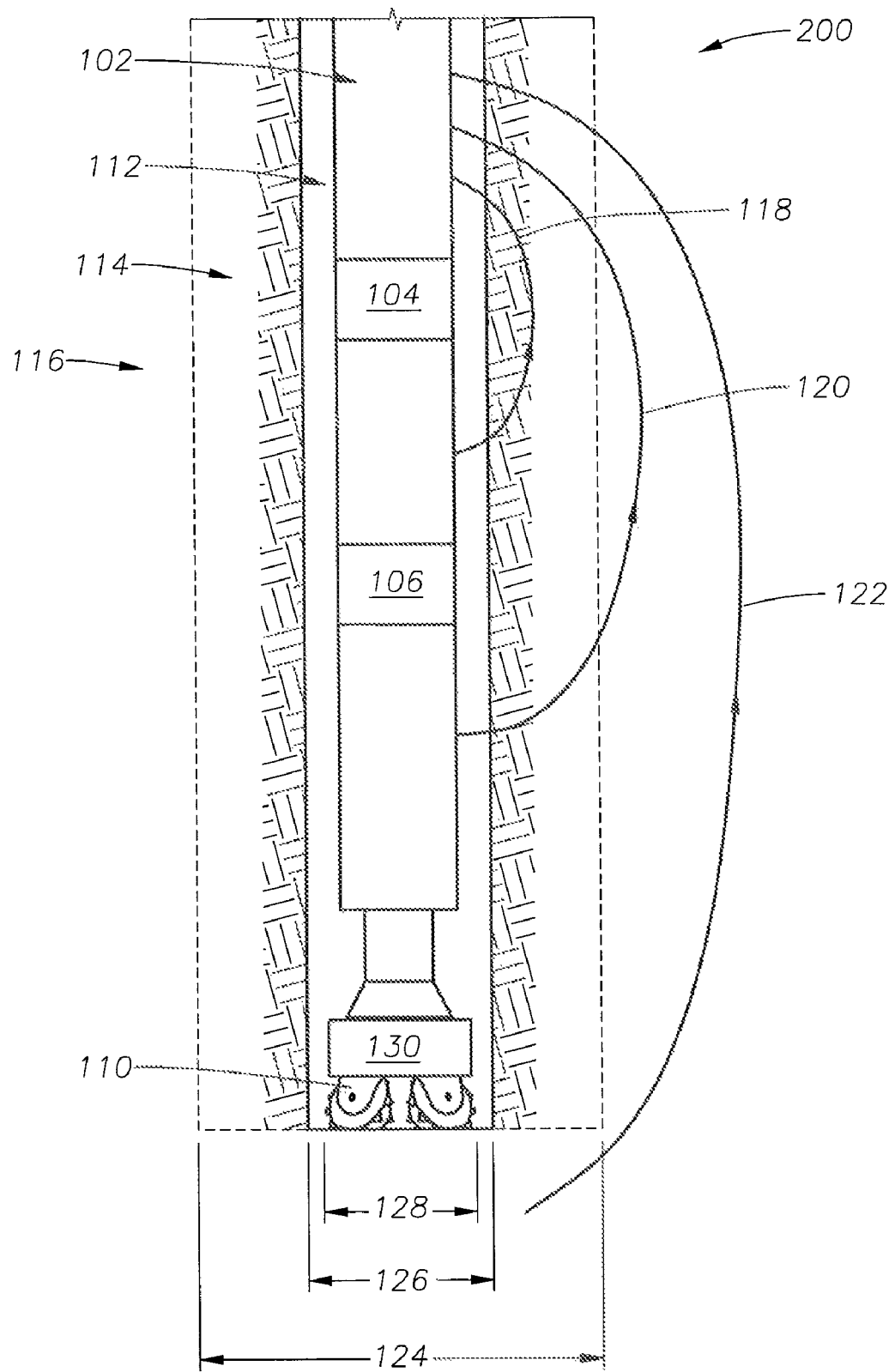
FIG. 3A illustrates schematically a method and apparatus of this disclosure for measuring resistivity.
Figure 3B:
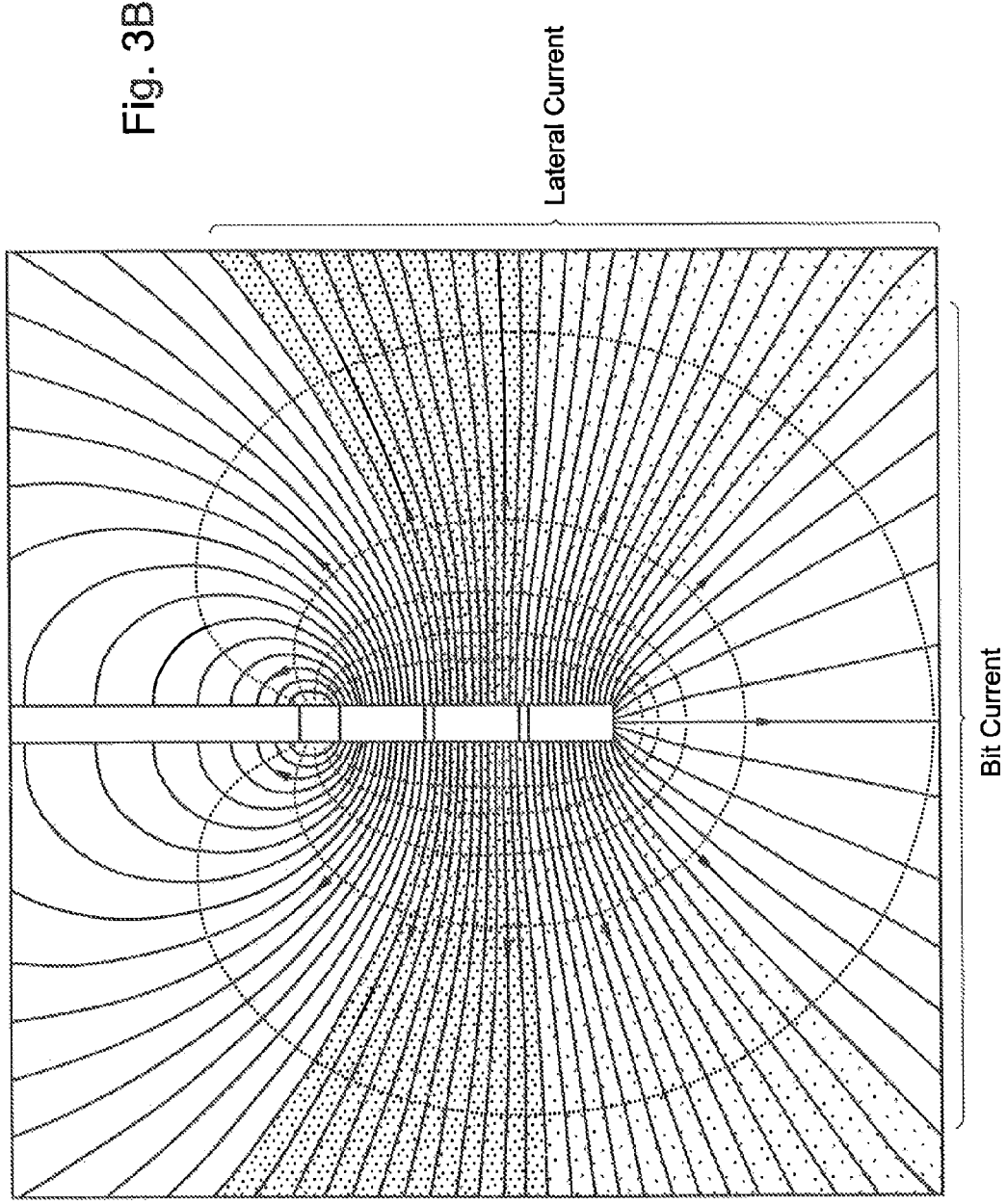
FIG. 3B illustrates the computed current pattern obtained from the apparatus of FIG. 3A.

In accordance with the present disclosure, as illustrated in FIG. 3A, the lower toroid 130 is placed down at the tip of the bit 110, or very near thereto. In such embodiments the rock being investigated will be increasingly moved forward ahead of the bit 110, as illustrated schematically in FIG. 3B. While this may seem to be a subtle change, the result is much greater ability to focus the resistivity measurements, and thus the pore pressure measurements, in front of the drill bit.

In another method, resistivity ahead of the drill bit may be made through use of a transient electromagnetic survey. The transient electromagnetic survey method is a relatively new technology that is currently being developed to measure formation resistivity below the earth's surface using a seabed device. Representative non-patent literature references include SPE 11054, SPE 108631, and IPTC 11511. U.S. Pat. Nos. 7,203,599; 7,202,669; 7,023,213; and 7,307,424, all incorporated herein by reference in their entirety, may be mentioned as further examples. The '599 patent discloses a method for controlled source electromagnetic (CSEM) Earth surveying, including deploying a plurality of electromagnetic sensors in a selected pattern at the top of an area of the Earth's subsurface to be surveyed. At least one of a transient electric field and a transient magnetic field is applied to the Earth in the vicinity of the sensors at a plurality of different positions. At least one of electric field amplitude and magnetic field amplitude at each of the sensors is recorded each time the transient electric field and/or magnetic field is applied. Each recording is adjusted for acquisition geometry. An image is generated corresponding to at least one sensor position using at least two stacked, adjusted recordings. The '669 patent discloses applying an electromagnetic field using a dipole antenna transmitter, and detecting using a dipole antenna receiver. The measurements are taken with the antenna both in-line and parallel and the difference between the two sets of measurements exploited. A characteristic difference indicates a high resistive layer, which corresponds to a hydrocarbon reservoir. The '213 patent discloses a subsurface imaging cable, including a plurality of sensor modules, wherein the plurality of the sensor modules are flexible and each of the plurality of the sensor modules is spaced apart on the subsurface imaging cable at a selected distance; and a flexible medium connecting the plurality of the sensor modules, wherein the subsurface imaging cable is flexible and adapted to be wound on a reel. A method for subsurface images includes acquiring direct-current measurements at a plurality of sites in a survey area; acquiring a first set of electric and magnetic measurements from natural electromagnetic fields at the plurality of sites; acquiring a second set of electric and magnetic measurements using controlled electric and magnetic sources at the plurality of sites; and determining a subsurface conductivity distribution from the direct-current measurements and the first set and the second set of electric and magnetic measurements. The '424 patent discloses an electromagnetic survey method for surveying an area that potentially contains a subterranean hydrocarbon reservoir. The method comprises detecting a detector signal in response to a source electromagnetic signal, resolving the detector signal along at least two orthogonal directions, and comparing phase measurements of the detector signal resolved along these directions to look for a phase separation anomaly indicative of the presence of a buried hydrocarbon layer. The '424 patent also discloses planning a survey using this method, and analysis of survey data taken using this survey method. The first and second data sets may be obtained concurrently with a single horizontal electric dipole source antenna. The method is also largely independent of a source-detector pair's relative orientation and so provides for good spatial coverage and easy-to-perform surveying.

Figure 4:
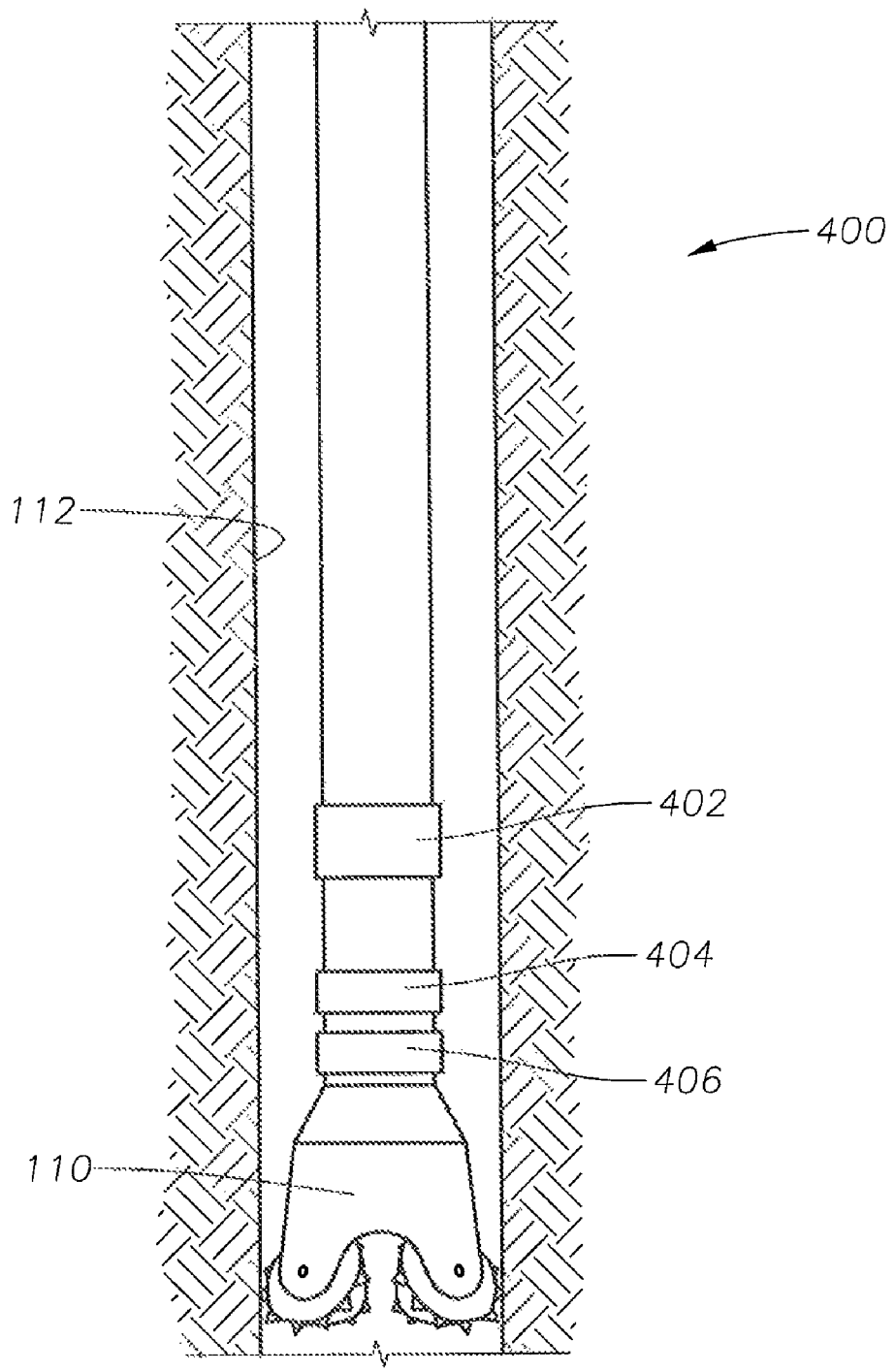
FIG. 4 illustrates schematically a transient electromagnetic survey apparatus deployed within a borehole to measure resistivity in front of the drill bit.

In accordance with the present disclosure, transient electromagnetic survey techniques and apparatus normally used in marine surveys may be modified to be deployed within a borehole 112, as illustrated schematically in embodiment 400 of FIG. 4. A dipole transmitter 402 is mounted on the drill string behind the drill bit 110, and EM receivers 404 and 406 are mounted below the dipole. The EM receivers 404, 406 measure a normally reflected wave in the axis of the drill string. This normally reflected wave would be off of resistivity contrasts directly in front of the bit. This would work very much like an acoustic VSP but working in the electromagnetic spectrum.

Another method to make a measurement in front of the bit would be to use modified continuous deep directional electromagnetic measurements. Deep directional electromagnetic (EM) tool measurements are known and explained, for example, in Omeragic et al., "Deep Directional Electromagnetic Measurements for Optimal Well Placement", SPE 97045 (2005), and Sato et. al., U.S. Pat. No. 5,508,616, incorporated by reference herein. Illustrated in FIG. 5 is a representative example embodiment 500 of the prior art technique and apparatus of Sato et al., illustrating a method of and an apparatus for directional induction logging of formations around a borehole. The aim was to measure the electric conductivity of a formation in a particular direction with respect to the circumference of the borehole. In the method and apparatus according to Sato et al., at least one transmitting coil 506 and at least one receiving coil 504 are disposed in a borehole 112 and along the axis thereof in an inclined fashion such that these coils face one another and thus are caused to have directivity provided for examining electric characteristics of a formation around the borehole. The transmitting and receiving coils 506 and 504 are disposed such that the axes of these coils are inclined by an inclination angle while these coils face each other. With this arrangement, directivity can be obtained. Further, the transmitting and receiving coils 506 and 504 are rotated in the borehole 112 by a drive device (not illustrated) for measuring the electric conductivity around the borehole. Further, the electric conductivity is measured continuously along the hole axis by rotating the transmitting and receiving coils in the borehole by the drive device. An alternating current is supplied to the transmitting coil 506 from a transmitter to generate a magnetic field, thus generating an eddy current substantially proportional to the electric conductivity in the surrounding formation. The eddy current generates a secondary magnetic field which is measured with the receiving coil 504. The amplitude of the voltage induced across the receiving coil 504 and the phase difference with respect to the current supplied to the transmitting coil 506 are measured (for example by a phase sensitive detector to be transmitted via a cable to the ground surface for recording with well-known recording means). With the inclination of the transmitting and receiving coils in one direction, there is formed a place 508 in the surrounding formation of concentration of eddy current generation, and thus it is possible to measure only the electric conductivity in a particular direction.

The methods and apparatus of Sato et al. exemplified by prior art embodiment 500 in FIG. 5 may be modified for the purposes of the present disclosure to have the receivers tuned to isolate the signal arriving from the formation in front of the bit, as illustrated schematically in embodiment 600 of FIG. 6. Embodiment 600 includes a tool 606 including a transmitter and receiver pair, 602, 604 in the drill string 601. With the inclination of the transmitting and receiving coils as illustrated in FIG. 6, there is formed a place 608 in front of the drill bit 110 for concentration of eddy current generation, and thus it is possible to measure only the electric conductivity in front of the drill bit during drilling of a well, prior to the bit entering a region of interest of the formation. The region 608 might be, for example, 1 to 100 feet in front of the drill bit, or 1 to 90, or 1 to 80, or 1 to 70, or 1 to 60, or 1 to 50, or 1 to 40, or 1 to 30, or 1 to 20 feet in front of the drill bit. The distance resistivity can be measured in front to the bit is, in part, a function of the conductivity contrast between the conductivity of the formation in which the tool is located and the conductivity of the formations in front of the bit. In inductive measurements as described in Sato et al. the distance one can see ahead increases as the conductivity of the formation ahead of the bit increases relative to the conductivity of the formation in which the tool is located. In resistivity measurements as described in Gianzero et al. the distance one can see ahead increases as the conductivity of the formation ahead of the bit decreases relative to the conductivity of the formation in which the tool is located. The distance a tool can measure ahead can also be a function of the sensitivity of the electronics, especially in the case of a transient electromagnetic method.

Figure 7:
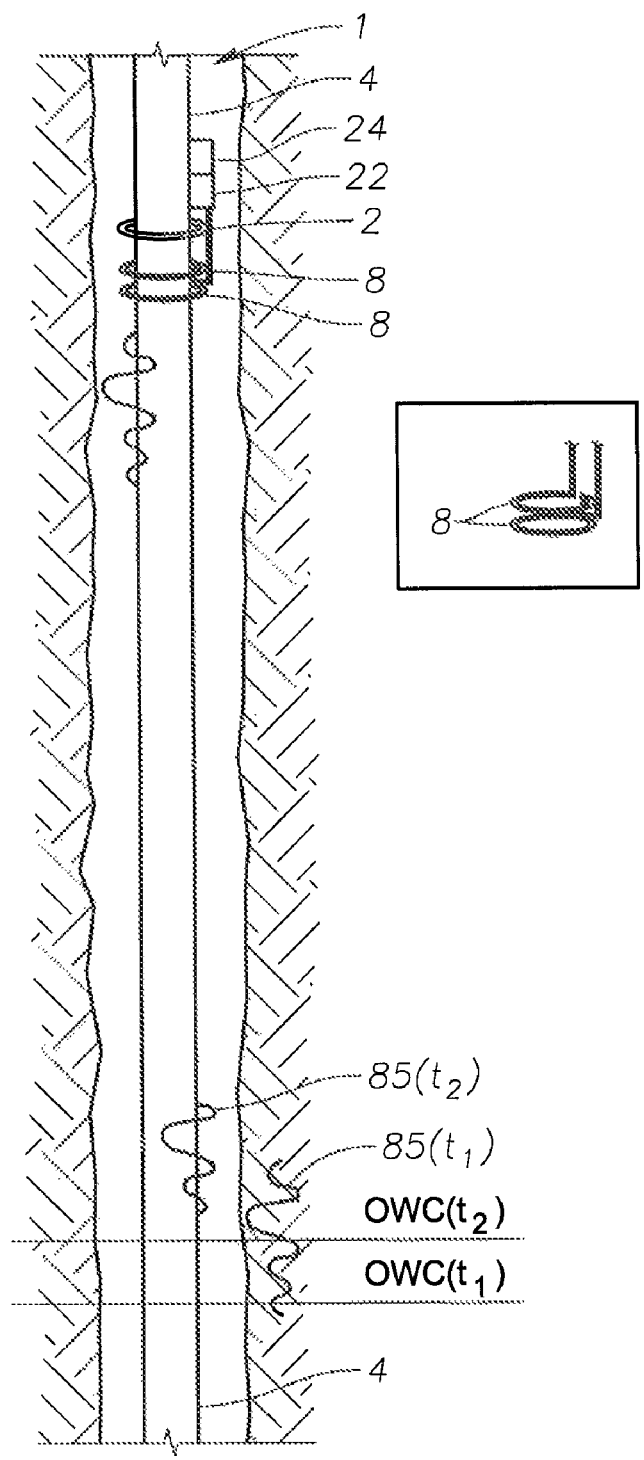
FIG. 7 illustrates a prior art apparatus for detecting changes of resistivity or dielectrical properties due to changes of fluid composition in the near-well area about a well in a geological formation.

Another method would be to use guided electromagnetic waves along the drill pipe to focus energy in front of the bit and measure the formation resistivity in this manner. This would be similar to that described in U.S. Pat. No. 6,556,014 except that it would be optimized to maximize the signal from the formation in front of the bit. In the '014 patent, a device is disclosed as illustrated herein in FIG. 7, for detecting changes of resistivity or dielectrical properties due to changes of fluid composition in the near-well area about a well 1 in a geological formation, comprising an electrically conductive tubing string 4, an electrical energy source 24, a signal generator 22, at least one transmitting antenna 2 for emitting electromagnetic waves along tubing string 4, one or more receiver antennas 8 for receiving electromagnetic waves 85 reflected from oil/water contact (OWC) along tubing string 4, devices for receiving signals 85 induced in receiver antennas 8, signal processing means (not illustrated) for processing the received signals 85, and communication devices (not illustrated) for transmitting signals representing the electrical signals and for receiving control signals.

Figure 8:
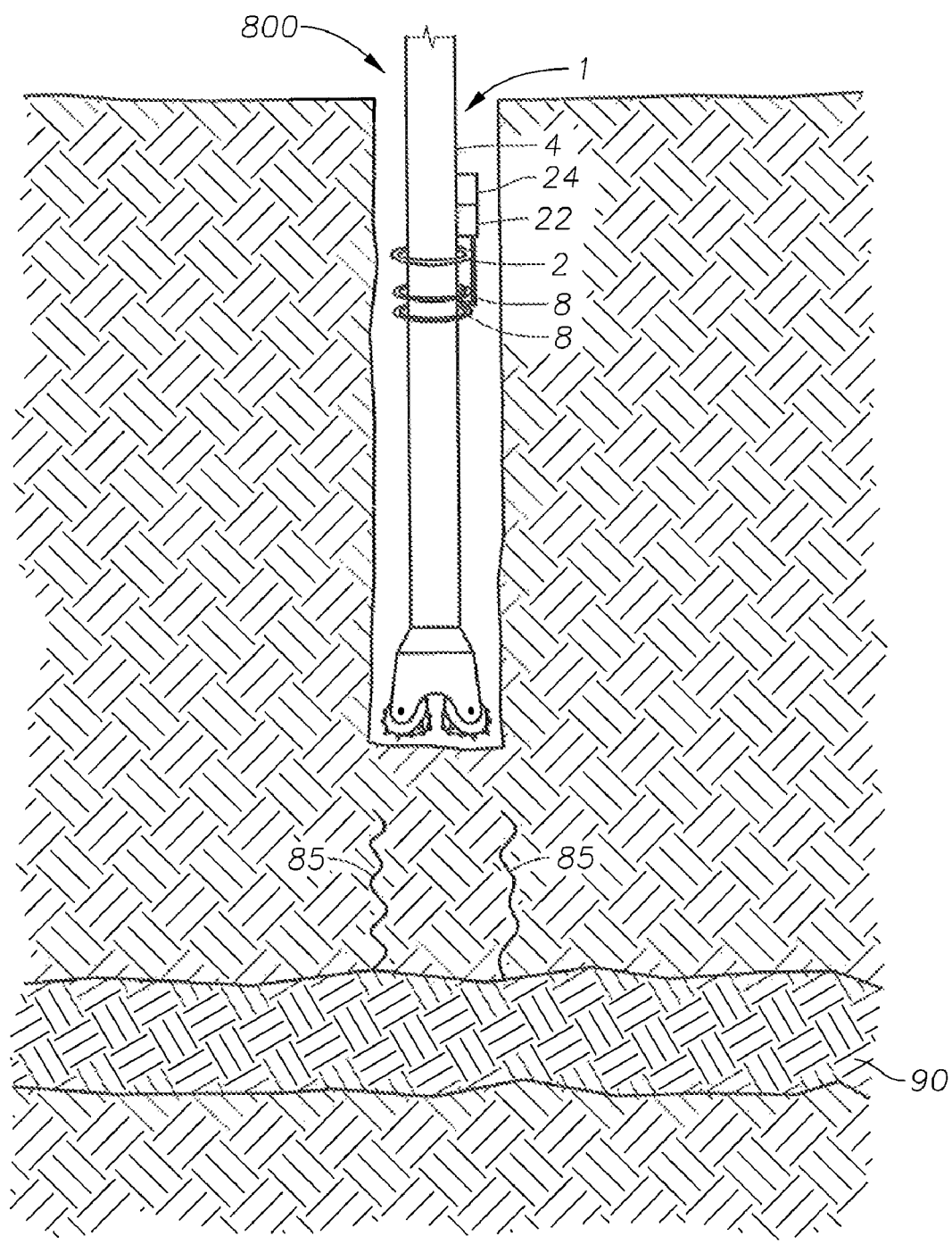
FIG. 8 illustrates an embodiment similar to the apparatus of FIG. 7 modified to focus energy in front of the drill bit and measure the formation resistivity ahead of the drill bit.

FIG. 8 illustrates an embodiment 800 modified to focus energy in front of the bit and measure the formation resistivity ahead of the drill bit. Rather than sensing an oil/water contact, the reflected waves 85 would be reflected off of the top of a hydrocarbon formation 90.

In accordance with the present disclosure, a primary interest lies in using one or more of the methods and apparatus described above to obtain resistivity measurements in front of the drill bit to make drilling decisions on pore pressure and formation properties in front of the bit before the bit exposes the formation, which as discussed may create undesirable consequences in the well. The skilled operator or designer will determine which method and apparatus is best suited for a particular well and formation to achieve the highest efficiency without undue experimentation.

The actual calculation of pore pressure from resistivity is straightforward, one method being that described by Hottman et al. In this calculation method, first the normal compaction trend for the area of interest is established by plotting the logarithm of shale resistivity from the device vs. depth. A similar plot is made for the well in question. The top of the overpressured formation is found by noting the depth at which the plotted points diverge from the trend line. The pressure gradient of a reservoir at any depth is found by calculating the ratio of the extrapolated normal shale resistivity, and the fluid pressure gradient corresponding to the calculated ratio. The reservoir pressure is obtained by multiplying the fluid pressure gradient value by the depth. A pressure gradient profile for the well can be constructed by repeating the procedure at numerous depth values.

Another commonly used method to calculate pore pressure from resistivity is through the use of the Eaton relationship (Eaton, B. A., 1975, "The Equation for Geopressure Prediction from Well LOGS": SPE paper #5544). In this calculation method, first the normal compaction trend for the area of interest is established by plotting the logarithm of shale resistivity from the device vs. depth. A similar plot is made for the well in question. The top of the overpressured formation is found by noting the depth at which the plotted points diverge from the trend line. The pressure gradient of a reservoir at any depth is found by calculating the ratio of the measured shale resistivity to the extrapolated normal shale resistivity. The reservoir pressure is obtained by raising the ratio to the Eaton exponent (normally 1.2 for resistivity measurements) and then multiplying that against the difference between overburden stress minus normal pressure and then subtracting that from the overburden pressure. A pressure gradient profile for the well can be constructed by repeating the procedure at numerous depth values.

Useful drilling muds for use in the methods of the present disclosure include water-based, oil-based, and synthetic-based muds. The choice of formulation used is dictated in part by the nature of the formation in which drilling is to take place. For example, in various types of shale formations, the use of conventional water-based muds can result in a deterioration and collapse of the formation. The use of an oil-based formulation may circumvent this problem. A list of useful muds would include, but not be limited to, conventional muds, gas-cut muds (such as air-cut muds), balanced-activity oil muds, buffered muds, calcium muds, deflocculated muds, diesel-oil muds, emulsion muds (including oil emulsion muds), gyp muds, oil-invert emulsion oil muds, inhibitive muds, kill-weight muds, lime muds, low-colloid oil muds, low solids muds, magnetic muds, milk emulsion muds, native solids muds, PHPA (partially-hydrolyzed polyacrylamide) muds, potassium muds, red muds, saltwater (including seawater) muds, silicate muds, spud muds, thermally-activated muds, unweighted muds, weighted muds, water muds, and combinations of these.

Useful mud additives include, but are not limited to asphaltic mud additives, viscosity modifiers, emulsifying agents (for example, but not limited to, alkaline soaps of fatty acids), wetting agents (for example, but not limited to dodecylbenzene sulfonate), water (generally a NaCl or $CaCl_2$ brine), barite, barium sulfate, or other weighting agents, and normally amine treated clays (employed as a viscosification agent). More recently, neutralized sulfonated ionomers have been found to be particularly useful as viscosification agents in oil-based drilling muds. See, for example, U.S. Pat. Nos. 4,442,011 and 4,447,338, both incorporated herein by reference. These neutralized sulfonated ionomers are prepared by sulfonating an unsaturated polymer such as butyl rubber, EPDM terpolymer, partially hydrogenated polyisoprenes and polybutadienes. The sulfonated polymer is then neutralized with a base and thereafter steam stripped to remove the free carboxylic acid formed and to provide a neutralized sulfonated polymer crumb. To incorporate the polymer crumb in an oil-based drilling mud, the crumb must be milled, typically with a small amount of clay as a grinding aid, to get it in a form that is combinable with the oil and to keep it as a noncaking friable powder. Often, the milled crumb is blended with lime to reduce the possibility of gelling when used in the oil. Subsequently, the ionomer containing powder is dissolved in the oil used in the drilling mud composition. To aid the dissolving process, viscosification agents selected from sulfonated and neutralized sulfonated ionomers can be readily incorporated into oil-based drilling muds in the form of an oil soluble concentrate containing the polymer as described in U.S. Pat. No. 5,906,966, incorporated herein by reference. In one embodiment, an additive concentrate for oil-based drilling muds comprises a drilling oil, especially a low toxicity oil, and from about 5 gm to about 20 gm of sulfonated or neutralized sulfonated polymer per 100 gm of oil. Oil solutions obtained from the sulfonated and neutralized sulfonated polymers used as viscosification agents are readily incorporated into drilling mud formulations.

The mud system used may be an open or closed system. Any system used should allow for samples of circulating mud to be taken periodically, whether from a mud flow line, a mud return line, mud motor intake or discharge, mud house, mud pit, mud hopper, or two or more of these, as dictated by the resistivity data being received.

In actual operation, depending on the mud report from the mud engineer, the drilling rig operator (or owner of the well) has the opportunity to adjust the density, specific gravity, weight, viscosity, water content, oil content, composition, pH, flow rate, solids content, solids particle size distribution, resistivity, conductivity, and combinations of these properties of the mud. The mud report may be in paper format, or more likely today, electronic in format. The change in one or more of the list parameters and properties may be tracked, trended, and changed by a human operator (open-loop system) or by an automated system of sensors, controllers, analyzers, pumps, mixers, agitators (closed-loop systems).

"Drilling" as used herein may include, but is not limited to, rotational drilling, directional drilling, non-directional (straight or linear) drilling, deviated drilling, geosteering, horizontal drilling, and the like. Rotational drilling may involve rotation of the entire drill string, or local rotation downhole using a drilling mud motor, where by pumping mud through the mud motor, the bit turns while the drillstring does not rotate or turns at a reduced rate, allowing the bit to drill in the direction it points. A turbodrill may be one tool used in the latter scenario. A turbodrill is a downhole assembly of bit and motor in which the bit alone is rotated by means of fluid turbine which is activated by the drilling mud. The mud turbine is usually placed just above the bit.

"Bit" or "drill bit", as used herein, includes, but is not limited to antiwhirl bits, bicenter bits, diamond bits, drag bits, fixed-cutter bits, polycrystalline diamond compact bits, roller-cone bits, and the like. The choice of bit, like the choice of drilling mud, is dictated in part by the nature of the formation in which drilling is to take place.

The rate of penetration (ROP) during drilling methods of this disclosure depends on permeability of the rock (the capacity of a porous rock formation to allow fluid to flow within the interconnecting pore network), the porosity of the rock (the volume of pore spaces between mineral grains expressed as a percentage of the total rock volume, and thus a measure of the capacity of the rock to hold oil, gas, or water), and the amount or percentage of vugs. Generally the operator or owner of the well wishes the ROP to be as high as possible toward a known trap (any geological structure which precludes the migration of oil and gas through subsurface rocks, causing the hydrocarbons to accumulate into pools), without excess tripping in and out of the wellbore. In accordance with the present disclosure the drilling contractor or operator is able to drill more confidently and safely, knowing the resistivity and pore pressure in the formation ahead of the drill bit before the drill bit actually penetrates the hydrocarbon-bearing region.

FIG. 9 illustrates one method embodiment 900 of the present disclosure in flowchart form. First, as indicated in box 902, the drilling supervisor, probably in conjunction with the mud engineer, geologist or other person in charge would choose initial drilling mud, and the driller would choose the drill bit. Apparatus for determining resistivity in front of the drill bit would be selected and installed in the drill string, either on-site or at a site removed from the well. In box 904, drilling is then begun, drilling toward a target formation at a known azimuth and dip angle using the selected drilling mud, drill bit, and resistivity apparatus. Box 906, resistivity data in front of the bit is gathered. Box 908, pore pressure in front of the bit is computed based on the measured resistivity in front of the bit. Box 910, one or more of density, specific gravity, weight, viscosity, water content, oil content, composition, pH, flow rate, solids content, solids particle size distribution, resistivity, conductivity, or combination of any of these, of the drilling mud is adjusted based on measured resistivity or calculated pore pressure of the formation prior to the drill bit entering the formation. Box 912, continue drilling toward the target formation at a known azimuth and dip angle using the adjusted drilling mud. The resistivity may be measured continuously in real time, semi-continuously, periodically, or intermittently as desired. Porosity may be calculated at the same or different rate as the measurement of resistivity, and drilling mud parameters may be adjusted at the same or different rate as the resistivity and porosity. For example, resistivity in front of the bit may be measured continuously, porosity calculated once per minute, and mud weight adjusted once per minute.

From the foregoing detailed description of specific embodiments, it should be apparent that patentable methods and apparatus have been described. Although specific embodiments of the disclosure have been described herein in some detail, this has been done solely for the purposes of describing various features and aspects of the methods and apparatus, and is not intended to be limiting with respect to the scope of the methods and apparatus. It is contemplated that various substitutions, alterations, and/or modifications, including but not limited to those implementation variations which may have been suggested herein, may be made to the described embodiments without departing from the scope of the appended claims. For example, drill bit, drilling muds, and resistivity measurement apparatus other than those specifically described above may be employed, and are considered within the disclosure.

What is claimed is:

1. A method of using resistivity measurements focused in front of a drill bit obtained while drilling a subterranean well using a drilling mud, the method comprising:
   a) measuring resistivity in a focused region in front of the bit during drilling and prior to penetrating a known subterranean formation using the drill bit and the drilling mud, the drill string progressing at known dip and azimuth angles toward the subterranean formation; and
   b) using the measured resistivity to calculate pore pressure in the focused region in front of the drill bit in the formation as a function of measured resistivity in the focused region in front of the drill bit in the formation while the drill bit advances toward but before the bit penetrates the formation while drilling.

2. The method of claim 1 further comprising redirecting the drill bit while drilling toward locations in the formation where the calculated pore pressure is within an acceptable range for the mud and pressure control equipment being used.

3. The method of claim 2 wherein the redirecting occurs continuously.

4. The method of claim 1 further comprising adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the measured resistivity of the formation prior to the drill bit entering the formation.

5. The method of claim 4 wherein the adjusting occurs continuously.

6. The method of claim 1 further comprising adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the calculated pore pressure of the formation prior to the drill bit entering the formation.

7. The method of claim 1 wherein the measuring of resistivity ahead of the bit comprises a method selected from the group consisting of contact resistivity measurement focused in front of the bit, use of a transient electromagnetic survey, continuous deep directional electromagnetic measurements, and use of guided electromagnetic waves along the drill pipe.

8. The method of claim 1 wherein the mud is selected from the group consisting of oil-based muds, water-based muds, and synthetic-based muds.

9. The method of claim 1 wherein the measuring resistivity and calculating pore pressure occur continuously.

10. A method of using resistivity measurements focused in front of a drill bit obtained while drilling a subterranean well using a drilling mud, the method comprising:
    a) measuring resistivity in a focused region in front of the bit during drilling and prior to penetrating a known subterranean formation using the drill bit and the drilling mud, the drill string progressing at known dip and azimuth angles toward the subterranean formation; and
    b) using the measured resistivity to calculate change of pore pressure in the focused region in front of the drill bit in the formation as a function of change of measured resistivity in the focused region in front of the drill bit in the formation while the drill bit advances toward but before the bit penetrates the formation while drilling.

11. The method of claim 10 further comprising redirecting the drill bit while drilling toward locations in the formation where the calculated pore pressure is within an acceptable range for the mud and pressure control equipment being used.

12. The method of claim 10 further comprising adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the measured resistivity of the formation prior to the drill bit entering the formation.

13. The method of claim 12 wherein the mud is selected from the group consisting of oil-based muds, water-based muds, and synthetic-based muds.

14. The method of claim 10 further comprising adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the calculated pore pressure of the formation prior to the drill bit entering the formation.

15. The method of claim 10 wherein the measuring of resistivity data ahead of the bit comprises a method selected from the group consisting of contact resistivity measurement focused in front of the bit, use of a transient electromagnetic survey, continuous deep directional electromagnetic measurements, and use of guided electromagnetic waves along the drill pipe.

16. A method of reducing risk of a subterranean well collapse into a subterranean well being drilled toward a formation using resistivity measurements focused in front of the bit obtained while drilling the well using a drilling mud, the method comprising:
    a) measuring resistivity in a focused region in front of the bit during drilling and prior to penetrating a known subterranean formation using the drill bit and the drilling mud, the drill string progressing at known dip and azimuth angles toward the subterranean formation;
    b) using the measured resistivity in the focused region in front of the bit to calculate pore pressure of the formation in the focused region while the drill bit advances toward but before the bit penetrates the formation while drilling;
    c) estimating the likelihood of well wall collapse using the calculated pore pressure; and
    d) adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the calculated pore pressure in the focused region of the formation.

17. The method of claim 16 wherein the measuring of resistivity data ahead of the bit comprises a method selected from the group consisting of contact resistivity measurement focused in front of the bit, use of a transient electromagnetic survey, continuous deep directional electromagnetic measurements, and use of guided electromagnetic waves along the drill pipe.

18. The method of claim 16 wherein the measuring resistivity and calculating pore pressure occur continuously.

19. The method of claim 16 wherein the estimating occurs continuously.

20. The method of claim 16 wherein the adjusting occurs continuously.

21. A method of reducing risk of differentially sticking the drill string in a well being drilled toward a formation using resistivity measurements focused in front of the bit obtained while drilling the well using a drilling mud, the method comprising:
    a) measuring resistivity in a focused region in front of the bit during drilling and prior to penetrating a known subterranean formation using the drill bit and the drilling mud, the drill string progressing at known dip and azimuth angles toward the subterranean formation;
    b) using the measured resistivity in the focused region in front of the bit to calculate pore pressure in the focused region of the formation while the drill bit advances toward but before the bit penetrates the formation while drilling;

c) adjusting one or more parameters selected from the group consisting of density, specific gravity, weight, viscosity, water content, oil content, composition, pH, flow rate, solids content, solids particle size distribution, resistivity, conductivity, or any combination of any of these, of the drilling mud based on the calculated pore pressure in the focused region of the formation so as to minimize the differential pressure across the formation thereby reducing the risk of differential sticking.

22. The method of claim 21 wherein the measuring of resistivity ahead of the bit comprises a method selected from the group consisting of contact resistivity measurement focused in front of the bit, use of a transient electromagnetic survey, continuous deep directional electromagnetic measurements, and use of guided electromagnetic waves along the drill pipe.

23. The method of claim 21 wherein the measuring resistivity and calculating pore pressure occur continuously.

24. The method of claim 21 wherein the adjusting occurs continuously.

* * * * *